United States Patent [19]

Segatta et al.

[11] Patent Number: 5,244,028
[45] Date of Patent: Sep. 14, 1993

[54] TIRE SIDEWALL COMPOSITION CONTAINING SILICA HAVING LOW PH

[75] Inventors: Thomas J. Segatta, Fairlawn; Paul H. Sandstrom, Tallmadge; Zalman Ronen, Akron, all of Ohio

[73] Assignee: The Goodyear Tire & Rubber Company, Akron, Ohio

[21] Appl. No.: 886,261

[22] Filed: May 20, 1992

[51] Int. Cl.$^5$ .................. C08K 5/3415; C08K 5/18; C08K 5/13
[52] U.S. Cl. .................. 152/525; 524/104; 524/217; 524/255; 524/256; 524/257; 524/492; 524/493
[58] Field of Search .............. 524/492, 493, 255, 256, 524/257, 104, 217; 152/525

[56] References Cited

U.S. PATENT DOCUMENTS

| | | | |
|---|---|---|---|
| 2,806,012 | 9/1957 | Allen | 524/493 |
| 3,451,458 | 6/1969 | Stueber | 152/330 |
| 3,622,650 | 11/1971 | Berstein | 260/763 |
| 3,664,403 | 5/1972 | Doran et al. | 152/330 |
| 3,768,537 | 10/1973 | Hess et al. | 152/330 |
| 3,867,326 | 2/1975 | Rivin et al. | 260/37 N |
| 3,873,489 | 3/1975 | Thurn et al. | 250/33.6 AQ |
| 3,881,536 | 5/1975 | Doran, Jr. et al. | 152/330 |
| 3,938,574 | 2/1976 | Burmester et al. | 125/330 R |
| 3,965,055 | 6/1976 | Shichman et al. | 260/3 |
| 3,994,742 | 11/1976 | Russell et al. | 106/288 Q |
| 3,997,356 | 12/1976 | Thurn et al. | 106/288 Q |
| 4,004,627 | 1/1977 | Sandstrom et al. | 152/355 |
| 4,066,602 | 1/1978 | Pellico | 260/30.8 R |
| 4,118,367 | 10/1978 | Dawes et al. | 260/42.37 |
| 4,210,188 | 7/1980 | Banchieri | 152/353 C |
| 4,229,333 | 10/1990 | Wolff et al. | 260/23.7 M |
| 4,278,585 | 7/1981 | Stacy et al. | 260/42.15 |
| 4,373,041 | 2/1983 | Wood et al. | 524/77 |
| 4,390,648 | 6/1983 | Stacy | 523/216 |
| 4,436,847 | 3/1984 | Wagner | 523/203 |
| 4,474,908 | 10/1984 | Wagner | 523/213 |
| 4,517,336 | 5/1985 | Wolff et al. | 524/571 |
| 4,582,539 | 4/1986 | Stacy | 106/292 |
| 4,704,425 | 11/1987 | Lagarde et al. | 524/492 |

FOREIGN PATENT DOCUMENTS 03199247  8/1991  Japan.

*Primary Examiner*—Veronica P. Hoke
*Attorney, Agent, or Firm*—Bruce J. Hendricks

[57] ABSTRACT

The present invention relates to a pneumatic tire sidewall and to elastomeric compositions useful therefor. The elastomeric compositions are comprised of:
(a) natural rubber, polybutadiene, or mixtures thereof;
(b) from about 1.0 to 5.0 phr of a precipitated silica filler having a BET surface area of between 100 and 250 square meters per gram and a pH of from 4.0 to 6.5;
(c) from about 1.5 to 10.0 phr of an antidegradant selected from the group consisting of amines, phenolics and mixtures thereof.

6 Claims, No Drawings

TIRE SIDEWALL COMPOSITION CONTAINING SILICA HAVING LOW PH

BACKGROUND OF THE INVENTION

The present invention relates to rubber compositions particularly suited for use in the sidewall of a pneumatic tire. The sidewall of a pneumatic tire is subjected to severe weathering and dynamic flexing. Typically, such sidewall compositions contain various antiozonants/antioxidants (hereinafter referred to as antidegradants). Surprisingly, it has been discovered that the properties of conventional antidegradants in sidewall compositions can be enhanced when such sidewall compositions contain a silica filler having a defined pH.

SUMMARY OF THE INVENTION

The present invention relates to a pneumatic tire which comprises a general toroidal shaped carcass with a circumferential tread, shaped beads and a sidewall extending between said tread and beads wherein said sidewall is comprised of an elastomeric composition comprised of:
(a) natural rubber, polybutadiene or mixtures thereof;
(b) from about 1.0 to 5.0 phr of a precipitated silica filler having a BET surface area of between 100 and 250 square meters per gram and a pH of from 4.0 to 6.5;
(c) from about 1.5 to 10.0 phr of an antidegradant selected from the group consisting of amines, phenolics, and mixtures thereof.

The present invention also relates to an elastomeric composition comprised of:
(a) natural rubber, polybutadiene or mixtures thereof;
(b) from about 1.0 to 5.0 phr of a precipitated silica filler having a BET surface area of between 100 to 250 square meters per gram and a pH of from 4.0 to 6.5;
(c) from about 1.5 to 10.0 phr of an antidegradant selected from the group consisting of amines, phenolics, and mixtures thereof.

DETAILED DESCRIPTION OF THE INVENTION

The sidewall composition of the present invention includes natural rubber, polybutadiene and mixtures thereof. The term natural rubber includes all its various forms and reclaim forms. One type of polybutadiene that can be used is a high cis-1,4-polybutadiene rubber wherein at least 90 percent of its butadiene repeat units are a cis 1,4-isomeric structure. Medium vinyl polybutadiene may also be used. Medium vinyl polybutadiene generally has about 40 to about 60 percent of its butadiene repeat units as a 1,2-vinyl isomeric structure. Yet another polybutadiene which can be used is trans 1,4-polybutadiene. Trans 1,4-polybutadiene generally has at least 65 percent of its butadiene repeat units in a trans 1,4-isomeric structure. Generally speaking, the percent of 1,4-structure ranges from about 65 to 90 percent, with about 20 to 5 percent of its butadiene repeat units of a vinyl 1,2-structure and 15 to 2 percent of its butadiene repeat units in a cis 1,4-structure. More typically, trans 1,4-polybutadiene is characterized by having about 75 to an 85 weight percent of its butadiene repeat units in a trans 1,4-isomeric structure, about 12 to 18 percent of its butadiene repeat units in a vinyl 1,2-structure and 3 to about 8 percent of its butadiene repeat units in a cis 1,4-structure. Mixtures of natural rubber and polybutadiene may be used as well as mixtures of the various types of polybutadiene.

Siliceous fillers (alternatively referred to herein as siliceous or silica-reinforcing fillers, pigments, or fillers) useful in the invention are the finely-divided, precipitated silica, sometimes accompanied by an insoluble silicate, having little development of gel characteristics. These materials can be prepared by reaction of alkali metal silicate with acids. These silicas generally contain at least 50 percent by weight, and preferably at least 80 percent $SiO_2$ measured on the anhydrous basis (excluding bound and free water) and have a BET surface area (as measured using nitrogen gas) of between about 100 and about 250 square meters per gram, and preferably between about 140 and about 200 square meters per gram, and an average ultimate particle size between about 50 and about 2,000 angstroms, preferably between about 100 and about 400, and more preferably between 150 and 200 angstroms. The BET method of measuring surface area is described in the Journal of the American Chemical Society, Vol. 60, page 304 (1930). The high surface area/low particle size silicas are required to maintain adequate flex properties. A critical feature of the silica fillers is that the pH range from 4.0 to 6.5. Preferably, the pH is between 5.3 and 5.8. The pH is measured by testing the pH of a stirred 5 weight percent slurry of the silica in $CO_2$-free distilled water.

The silica filler is present in the sidewall composition in an amount ranging from about 1.0 to about 5.0 phr (parts per hundred rubber). Preferably, the amount ranges from about 1.5 to about 3.5 phr. Any more than these levels and the beneficial properties appear to diminish and any less than these ranges are insufficient to achieve the benefits. There is a relationship between the level of silica needed and the pH of the silica. A lower silica level is needed if the pH is at the lower end of the stated pH range. Likewise, a higher level (5 phr) is needed if a higher pH (e.g. 6.5) silica is used.

Conventional amine antidegradants may be used in the sidewall compositions of the present invention. Representative of the amine antidegradants which may be used include N,N'-di-substituted-p-phenylene diamines, substituted diphenylamines, and both polymerized and non-polymerized derivatives of 2,2,4-trimethyl-1,2-dihydroquinoline as well as the amide and imide age resistors. The derivatives of 2,2,4-trimethyl-1,2-dihydroquinoline are disclosed in U.S. Pat. No. 3,244,683 which is incorporated herein by reference in its entirety. Representative amide and imide age resisters are described in U.S. Pat. No. 3,658,769 which is incorporated herein in its entirety. Representative of the N,N'-di-substituted-p-phenylene diamines have the following structural formula:

wherein $R^1$ and $R^2$ are independently selected from the group of radicals consisting of alkyls having 3 to 12 carbon atoms, aryls having 6 to 12 carbon atoms, and aralkyls having 7 to 12 carbon atoms. Representative of the diphenylamines which may be used in the present invention are of the formula:

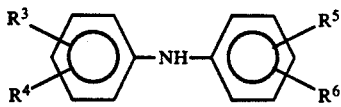

wherein $R^3$, $R^4$, $R^5$ and $R^6$ are independently selected from the group of radicals consisting of hydrogen, alkyls having 1 to 20 carbon atoms and aralkyls having 7 to 12 carbon atoms. Amides which may be used in the present invention are of the structure:

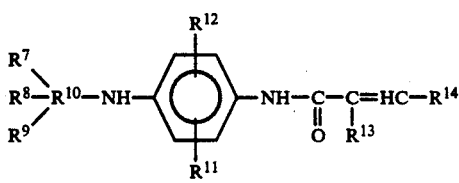

wherein $R^{10}$ is selected from the group of radicals consisting of arylenes having 6 to 12 carbon atoms, $R^7$ and $R^8$ are independently selected from the group of radicals consisting of hydrogen, alkyls having from 1 to 4 carbon atoms and alkoxys having from 1 to 4 carbon atoms, $R^9$ is selected from the group of radicals consisting of hydrogen, alkyls having from 1 to 4 carbon atoms, alkoxys having from 1 to 4 carbon atoms and a radical having the following structural formula:

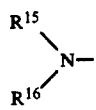

wherein $R^{15}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{16}$ is selected from the group of radicals consisting of hydrogen and alkyls having from 1 to 12 carbon atoms and wherein $R^{11}$ and $R^{12}$ are selected from the group of radicals consisting of hydrogen, alkyls having from 1 to 4 carbon atoms, $R^{13}$ is selected from the group of radicals consisting of hydrogen, alkyls having from 1 to 4 carbon atoms, aryls having from 6 to 12 carbon atoms, aralkyls having from 7 to 13 carbon atoms, cycloalkyls having from 5 to 12 carbon atoms, carboxymethyl radicals and carbalkoxymethyl radicals, and $R^{14}$ is selected from the group of radicals consisting of hydrogen, alkyls having from 1 to 4 carbon atoms, aryls having from 6 to 12 carbon atoms, cycloalkyls having from 5 to 12 carbon atoms, cycloalkyls having from 5 to 12 carbon atoms, carboxyl radicals and carbalkoxy radicals. Preferably $R^7$, $R^8$ and $R^9$ are each hydrogen. $R^{10}$ is preferably an arylene having 6 carbon atoms. $R^{11}$ and $R^{12}$ are preferably hydrogen. Preferably, $R^{13}$ is an alkyl having 1 carbon atom, $R^{14}$ is hydrogen, and $R^{15}$ is an alkyl having 1 carbon atom.

Imides may also be used in the sidewall compositions of the present invention. These imides are intended to be under the term amine antidegradant. Such imides may have the following structural formula:

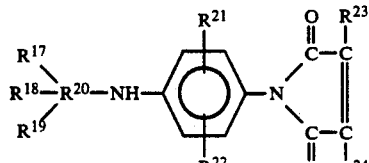

and

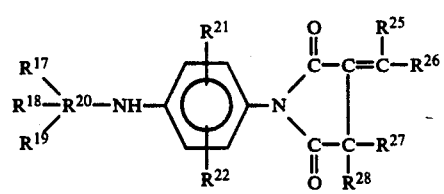

wherein $R^{20}$ is selected from the group of radicals consisting of arylenes having 6 to 12 carbon atoms, $R^{17}$ and $R^{18}$ are independently selected from the group of radicals consisting of hydrogen, alkyls having from 1 to 4 carbon atoms and alkoxys having from 1 to 4 carbon atoms, $R^{19}$ is selected from the group of radicals consisting of hydrogen, alkyls having from 1 to 4 carbon atoms, alkoxys having from. 1 to 4 carbon atoms and a radical having the following structural formula:

wherein $R^{29}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{30}$ is selected from the group of radicals consisting of hydrogen and alkyls having from 1 to 12 carbon atoms and wherein $R^{21}$ and $R^{22}$ are alkyls having from 1 to 4 carbon atoms, and wherein $R^{23}$, $R^{24}$, $R^{25}$, $R^{26}$, $R^{27}$ and $R^{28}$ are independently selected from the group of radicals consisting of hydrogen and alkyls having 1 to 4 carbon atoms. Preferably, $R^{19}$ and $R^{18}$ are hydrogen, $R^{19}$ is hydrogen, $R^{20}$ is an arylene having 6 carbon atoms, $R^{21}$ is hydrogen, $R^{22}$ is hydrogen, $R^{23}$ is hydrogen, $R^{24}$ is hydrogen, $R^{25}$ is hydrogen, $R^{26}$ is hydrogen, $R^{27}$ is hydrogen, and $R^{28}$ is hydrogen.

Specific amines which may be used in the sidewall composition of the present invention include
N,N'-diphenyl-p-phenylenediamine,
N,N'-di-beta-naphthyl-p-phenylenediamine,
N-o-tolyl N'-phenyl-p-phenylenediamine,
N,N-di-p-tolyl-p-phenylenediamine,
N-1,3-dimethylbutyl-N'-phenyl-p-phenylenediamine,
N-1,4-dimethylpetyl-N'-phenyl-p-phenylenediamine,
N-isopropyl-N'-phenyl-p-phenylenediamine,
N-1-methylpropyl-N'-phenyl-p-phenylenediamine,
N-cyclohexyl-N'-phenyl-p-phenylenediamine,
N,N'-bis-(1-ethyl-3-methylpentyl)-p-phenylenediamine,
N,N'-bis-(1,4-dimethylpentyl)-p-phenylenediamine,
N,N'-bis-(1-methylpropyl)-p-phenylenediamine,
4,4'-bis-(di-alpha-methylbenzyl) diphenylamine,
4,4'-dioctyldiphenylamine, 4,4'-dinonyldiphenylamine,
polymerized-2,2,4-trimethyl 1,2-dihydroquinoline,
6-dodecyl-1,2-dihydro-2,2,4-trimethylquinoline, 6-ethoxy 1,2-dihydro-2,2,4-trimethylquinoline,
N-(4-anilinophenyl)methacrylamide,
N-(4-anilinophenyl)maleimide,
N-(4-anilinophenyl)itaconimide,
N-(4-anilinophenyl)citraconimide,
N-[4-(4-methylanilino)phenyl]maleimide,
N-[4-(4-methylanilino)phenyl]itaconimide,
N-[4-(4-methoxyanilino)phenyl]maleimide,
N-[4-(4-methoxyanilino)phenyl]itaconimide,
N-[4-(4-ethoxyanilino)phenyl]maleimide,
N-[4-(4-ethoxyanilino)phenyl]itaconimide,
N-[4-(4-ethoxyanilino)phenyl]citraconimide,
N-(4-anilinophenyl)phenylmaleimide,
N-[4-(4-N,N-dimethylaminoanilino)phenyl]maleimide,
N-(4-anilinophenyl)acrylamide,
N-(4-anilinophenyl)methacrylamide,
N-(4-anilinophenyl)cinnamamide,
N-(4-anilinophenyl)crotonamide,
N-[4-(4-methylanilino)phenyl]acrylamide,
N-[4-(4-methylanilino)phenyl]methacrylamide,
N-[4-(4-methoxyanilino)phenyl]acrylamide,
N-[4-(4-methoxyanilino)phenyl]methacrylamide,
N-[4-(4-ethoxyanilino)phenyl]acrylamide,
N-[4-(4-ethoxyanilino)phenyl]methacrylamide,
N-[4-(4-N,N-dimethylaminoanilino)phenyl]acrylamide,
N-(4-anilinophenyl)maleamic acid,
N-(4-anilinophenyl)itaconamic acid,
N-[4-(4-methylanilino)phenyl]maleamic acid, and
N-(4-anilinophenyl)citraconamic acid.

The level of amine antidegradant is from about 5 to 10 parts by weight per 100 parts by weight of rubber (phr). Preferably, the level of amine compound is from about 1.5 to 7.0 phr.

Phenolic antidegradants may also be used in the sidewall compounds of the present invention. One example of a conventional phenolic antidegradant is represented by the following structural formula:

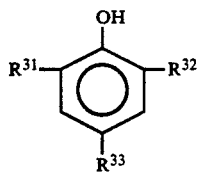

wherein $R^{31}$ and $R^{32}$ are selected from the group of radicals consisting of hydrogen, tertiary alkyls having 4 to 9 carbon atoms, cycloalkyls having 5 to 12 carbon atoms and aralkyls having 7 to 12 carbon atoms and wherein $R^{33}$ is selected from the group of radicals consisting of alkyls having 1 to 20 carbon atoms, cycloalkyls having 5 to 12 carbon atoms and aralkyls having 7 to 12 carbon atoms.

Specific examples of phenolic antidegradants of the above structural formula include 2,6 di-tertiarybutyl-4-methyl phenol, 2-tertiaryoctyl-4,6-ditertiarybutyl phenol, 2,4,6-tris-(α-methylbenzyl)phenol, 4-nonylphenol, 2,4-dinonylphenol, and 2,4-bis(α,α-dimethylbenzyl)-6-tertiarybutylphenol. A preferred phenolic antidegradant of the above structural formula is Wingstay ®-C which is commercially available from The Goodyear Tire & Rubber Company of Akron, Ohio.

Additional phenolic antidegradants which may be used in the sidewall composition of the present invention are the alkylated reaction products of simple phenols and dicyclopentadiene. Examples of such phenolic antidegradants are described in U.S. Pat. No. 3,305,522 which is incorporated herein by reference. A commercially available antidegradant of this type is sold under the trademark Wingstay ®-L from The Goodyear Tire & Rubber Company of Akron, Ohio.

Additional phenolic antidegradants which may be used the sidewall composition of the present invention are described and illustrated in U.S. Pat. No. 3,756,549 and U.S. Pat. No. 3,080,338, both of which are incorporated herein by reference.

The level of the phenolic antidegradant when used alone may vary and range from about 2.0 to 10 phr. Preferably, the phenolic antidegradant is used in combination with an amine antidegradant and is used in an amount ranging from about 0.25 to about 1.25 phr.

Vulcanization of the sidewall composition of the present invention is generally carried out at conventional temperatures ranging from about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the rubber, silica, and antidegradants, other rubber additives may also be incorporated in the sidewall composition. The additives commonly used in rubber vulcanizates are, for example, carbon black, tackifier resins, processing aids, stearic acid, activators, waxes, oil and peptizing agents. As known to those skilled in the art, depending on the intended use of the rubber compound, certain additives mentioned above are commonly used in conventional amounts. Typical additions of carbon black comprise about 35 to 60 parts by weight of diene rubber (phr), preferably 40 to 55 phr. Typical amounts of tackifier resins comprise about 1 to 5 phr. Typical amounts of stearic acid comprise 1 to about 2 phr. Typical amounts of zinc oxide comprise 2 to 5 phr. Typical amounts of waxes comprise 1 to 5 phr. Typical amounts of oils comprise 2.0 to 15 phr. Typical amounts of peptizers comprise 0.1 to 1 phr. The presence and relative amounts of the above additives are not an aspect of the present invention.

The vulcanization of the silica filled sidewall composition is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 3 phr.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01-0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanizate temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The pneumatic tires of the present invention may be radial or bias. Preferably, the tires are radial.

For the following examples, cure properties were determined using a Monsanto oscillating disc rheometer which was operated at a temperature of 150° C. and at a frequency of 100 CPM. A description of oscillating disc rheometers can be found in the Vanderbilt Rubber Handbook edited by Robert O. Babbit (Norwalk, Conn., R. T. Vanderbilt Company, Inc., 1978), pages 583-591. The use of this cure meter and standardized values read from the curve are specified in ASTM D-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber compositions that were prepared. These properties include a torque minimum (Min Torque), a torque maximum (Max Torque, and minutes to 90% of the torque increase (T90).

The following examples are presented in order to illustrate but not limit the present invention.

EXAMPLE 1

Physical Testing

A series of different silicas were used in a standard sidewall composition. The properties of each silica are listed below.

|  | pH | % $H_2O$ | BET $m^2/g$ | CTAB $m^2/g$ |
|---|---|---|---|---|
| Silica A | 5.5 | 5.5 | 180 | 111 |
| Silica B | ~7.3 | 6.4 | 127 | 98 |
| Silica C | 8.9 | 5.2 | 120 | 85 |

Table I below shows the sidewall compositions that were used in this example. The rubber compositions were prepared in a 2-stage Banbury mix. All parts and percentages are by weight unless otherwise noted. The cure data as well as other physical data for each sample are listed in Table I.

The significance of the data is that the low pH silica shows a weathering advantage when used at 2.5 phr. At higher levels (5.0 phr), the advantage disappears. Similarly, use of the high pH silica does not show the advantages of the low pH silica when used at the same level. This weathering advantage is significant even though the control compounds (identified as 1 and 2) vary greatly in time to failure. The Rheometer and stress strain data demonstrate that other basic properties are not detrimentally altered with the use of the low pH silica.

TABLE I

|  | Control 1 | B | C | D | E | F | G | Control 2 |
|---|---|---|---|---|---|---|---|---|
| Natural Rubber | 50 | 50 | 50 | 50 | 50 | 50 | 50 | 50 |
| High Cis-Polybutadiene | 50 | 50 | 50 | 50 | 50 | 50 | 50 | 50 |
| HAF Black | 45 | 45 | 45 | 45 | 45 | 45 | 45 | 45 |
| Wax | 1.5 | 1.5 | 1.5 | 1.5 | 1.5 | 1.5 | 1.5 | 1.5 |
| Oil | 6.2 | 5.0 | 5.0 | 5.0 | 5.0 | 5.0 | 5.0 | 6.2 |
| Antidegradant[1] | 7.0 | 7.0 | 7.0 | 7.0 | 7.0 | 7.0 | 7.0 | 7.0 |
| Silica (pH = 5.5) | 0 | 0 | 0 | 5 | 0 | 0 | 2.5 | 0 |
| Silica (pH ~ 7.3) | 0 | 0 | 5 | 0 | 0 | 2.5 | 0 | 0 |
| Silica (pH = 8.9) | 0 | 5 | 0 | 0 | 2.5 | 0 | 0 | 0 |
| Curatives | 8.7 | 8.6 | 8.6 | 8.6 | 8.6 | 8.6 | 8.6 | 8.7 |
| Total | 168.4 | 172.1 | 172.1 | 172.1 | 169.6 | 169.6 | 169.6 | 168.4 |
| Rheometer, 150° C. | | | | | | | | |
| Max. Torque (dN · m) | 37.3 | 38.8 | 39.2 | 38.3 | 38.5 | 38.7 | 38.5 | 37.7 |
| Min. Torque (dN · m) | 9.9 | 11.3 | 11.7 | 11.5 | 10.9 | 11.0 | 11.4 | 10.1 |
| T90 (min.) | 15.1 | 15.5 | 15.4 | 15.6 | 15.5 | 15.4 | 15.7 | 15.3 |
| Stress-Strain 36 min./150° C. | | | | | | | | |
| 300% Modulus (MPa) | 7.3 | 8.1 | 7.7 | 7.7 | 7.8 | 7.8 | 8.0 | 7.4 |
| Tensile (MPa) | 14.2 | 15.5 | 15.6 | 15.5 | 15.4 | 15.7 | 16.3 | 15.0 |
| Elongation (%) | 507 | 511 | 533 | 528 | 517 | 525 | 530 | 523 |
| Roof Top Dynamic Testing 36 min./150° C. | | | | | | | | |
| Days to fail | 124 | 41 | 124 | 66 | 75 | 94 | 205 | 52 |

(1) A mixture of
(a) N-1,3-dimethylbutyl N'phenyl paraphenylene diamine;
(b) diarylphenylenediamine and
(c) polymerized trimethyldihydroquinoline.

EXAMPLE 2

In a second study, a commercially available silica was used and compared to the same sidewall formulation when the silica was left out. The silica was purchased from PPG as Hi-Sil ® 210. PPG literature describe this silica as having a pH of 7 and a BET surface area of 150. Table II below shows the sidewall compositions that were used in this example. The rubber compositions were prepared in a 2-stage Banbury mix. All parts are by weight unless otherwise noted. The cure data as well as other physical data for each sample are listed in Table II. In this example, two controls were used and compared to a sidewall composition containing 2.5 parts of Hi-Sil ® 210.

TABLE II

|  | Control I | A | Control II |
|---|---|---|---|
| Natural Rubber | 50 | 50 | 50 |
| High Cis-BR | 50 | 50 | 50 |
| HAF Carbon Black | 45 | 45 | 45 |
| Wax | 1.5 | 1.5 | 1.5 |
| Oil | 6.2 | 6.2 | 6.2 |
| Antidegradant[1] | 5.0 | 5.0 | 5.0 |
| Precipitated Hi-Sil 210 | 0 | 2.5 | 0 |
| Curatives | 8.7 | 8.7 | 8.7 |
| Total | 166.4 | 168.9 | 166.4 |
| Rheometer 150° C. | | | |
| Max. Torque (dN · m) | 37.9 | 40.9 | 38.3 |
| Min. Torque (dN · m) | 10.3 | 12.8 | 10.3 |
| T90 (min.) | 15.5 | 14.4 | 15.4 |
| Stress-Strain 27/150° C. | | | |
| 300% Modulus (MPa) | 7.8 | 8.9 | 8.2 |
| Tensile (MPa) | 15.5 | 17.9 | 17.8 |
| Elongation | 512 | 522 | 543 |
| Roof Top Dynamic Testing 27/150° C. | | | |
| Time to Fail (days) | 125 | 85 | 110 |

This study, again, indicates that the typical commercial silicas available with a neutral pH (approximately 7) do not show beneficial weathering results and are similar to those seen in Table I with the silica of about 7 pH.

What is claimed is:

1. A pneumatic tire which comprises a general toroidal shaped carcass with a circumferential tread, shaped beads and a sidewall extending between said tread and beads wherein said sidewall is comprised of an elastomeric composition comprised of:
   (A) natural rubber, polybutadiene or mixtures thereof;
   (B) from about 1.0 to 3.5 phr of a precipitated silica filler having a BET surface area of between 100 and 250 square meters per gram and a pH of from 4.0 to 6.5;
   (C) from about 1.5 to 10.0 phr of an antidegradant selected from the group consisting of amines, phenolics, quinolines and mixtures thereof and
   (D) from about 35 to 65 phr of carbon black.

2. The pneumatic tire of claim 1 wherein the rubber is natural rubber.

3. The pneumatic tire of claim 1 wherein the rubber is a mixture of natural rubber and polybutadiene.

4. The pneumatic tire of claim 1 wherein said pH ranges from about 5.3 to 5.8.

5. The pneumatic tire of claim 1 wherein the amine antidegradants are selected from the group consisting of polymerized and non-polymerized derivatives of:
   (A) 2,2,4-trimethyl-1,2-dihydroquinoline;
   (B) N,N'-di-substituted-p-phenylene diamines have the following structural formula:

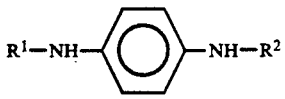

wherein $R^1$ and $R^2$ are independently selected from the group of radicals consisting of alkyls having 3 to 12 carbon atoms, aryls having 6 to 12 carbon atoms, and aralkyls having 7 to 12 carbon atoms;
   (C) diphenylamines having the structural formula:

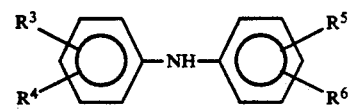

wherein $R^3$, $R^4$, $R^5$ and $R^6$ are independently selected from the group of radicals consisting of hydrogen, alkyls having 1 to 20 carbon atoms and aralkyls having 7 to 12 carbon atoms;
   (D) amides having the structural formula:

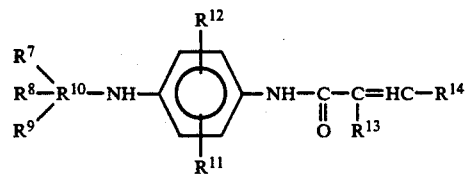

wherein $R^{10}$ is selected from the group of radicals consisting of arylenes having 6 to 12 carbon atoms, $R^7$ and $R^8$ are independently selected from the group of radicals consisting of hydrogen, alkyls having from 1 to 4 carbon atoms and alkoxys having from 1 to 4 carbon atoms, $R^9$ is selected from the group of radicals consisting of hydrogen, alkyls having from 1 to 4 carbon atoms, alkoxys having from 1 to 4 carbon atoms and a radical having the following structural formula:

wherein $R^{15}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{16}$ is selected from the group of radicals consisting of hydrogen and alkyls having from 1 to 12 carbon atoms and wherein $R^{11}$ and $R^{12}$ are selected from the group of radicals consisting of hydrogen, alkyls having from 1 to 4 carbon atoms, $R^{13}$ is selected from the group of radicals consisting of hydrogen, alkyls having from 1 to 4 carbon atoms, aryls having from 6 to 12 carbon atoms, aralkyls having from 7 to 13 carbon atoms, cycloalkyls having from 5 to 12 carbon atoms, carboxymethyl radicals and carbalkoxymethyl radicals, and $R^{14}$ is selected from the group of radicals consisting of hydrogen, alkyls having from 1 to 4 carbon atoms, aryls having from 6 to 12 carbon atoms, cycloalkyls having from 5 to 12 carbon atoms, cycloalkyls having from 5 to 12 carbon atoms, carboxyl radicals and carbalkoxy radicals, and;

(E) imides having the structural formula:

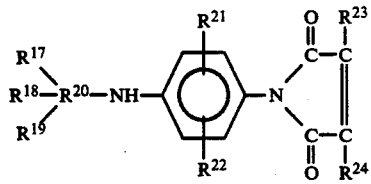

and

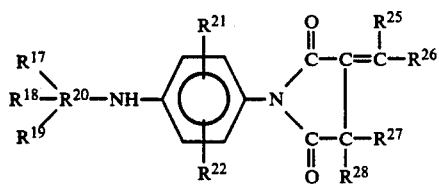

wherein $R^{20}$ is selected from the group of radicals consisting of arylenes having 6 to 12 carbon atoms, $R^{17}$ and $R^{18}$ are independently selected from the group of radicals consisting of hydrogen, alkyls having from 1 to 4 carbon atoms and alkoxys having from 1 to 4 carbon atoms, $R^{19}$ is selected from the group of radicals consisting of hydrogen, alkyls having from 1 to 4 carbon atoms, alkoxys having from 1 to 4 carbon atoms and a radical having the following structural formula:

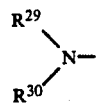

wherein $R^{29}$ is selected from the group of radicals consisting of alkyls having from 1 to 12 carbon atoms, cycloalkyls having from 5 to 12 carbon atoms, aryls having from 6 to 12 carbon atoms and aralkyls having from 7 to 13 carbon atoms and $R^{30}$ is selected from the group of radicals consisting of hydrogen and alkyls having from 1 to 12 carbon atoms and wherein $R^{21}$ and $R^{22}$ are alkyls having from 1 to 4 carbon atoms, and wherein $R^{23}$, $R^{24}$, $R^{25}$, $R^{26}$, $R^{27}$ and $R^{28}$ are independently selected from the group of radicals consisting of hydrogen and alkyls having 1 to 4 carbon atoms.

6. The pneumatic tire of claim 1 wherein the phenolic antidegradant is selected from the group consisting of:

(A) trialkylated phenolic antidegradants having the structural formula:

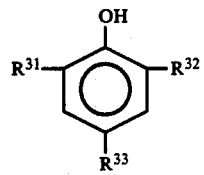

wherein $R^{31}$ and $R^{32}$ are selected from the group of radicals consisting of hydrogen, tertiary alkyls having 4 to 9 carbon atoms, cycloalkyls having 5 to 12 carbon atoms and aralkyls having 7 to 12 carbon atoms and wherein $R^{33}$ is selected from the group of radicals consisting of alkyls having 1 to 20 carbon atoms, cycloalkyls having 5 to 12 carbon atoms and aralkyls having 7 to 12 carbon atoms;

(B) alkylated reaction products of phenols and dicyclopentadiene;

(C) styrenated phenols; and (D) alkylated hydroquinone.

* * * * *